United States Patent

Skraba et al.

[11] 3,803,002
[45] Apr. 9, 1974

[54] METHOD AND APPARATUS FOR CONTROLLING THE OPERATING OF A FRACTIONATOR

[75] Inventors: Frank W. Skraba; DeLouis J. Fontenot; Milton H. Nollkamper, all of Sweeny, Tex.

[73] Assignee: Phillips Petroleum Company

[22] Filed: July 23, 1971

[21] Appl. No.: 165,561

[52] U.S. Cl............ 203/1, 203/2, 203/DIG. 18, 202/155, 202/160, 202/206
[51] Int. Cl............................................. B01d 3/42
[58] Field of Search............ 203/1, 2, DIG. 18, 99; 208/DIG. 1; 202/160, 206, 155

[56] References Cited
UNITED STATES PATENTS

| | | | |
|---|---|---|---|
| 3,032,479 | 5/1962 | Norman | 202/206 |
| 3,475,287 | 10/1969 | De Graff | 202/155 |
| 3,342,702 | 9/1967 | Rijnsdorp | 202/206 |
| 2,504,464 | 4/1950 | Stanley | 203/2 |
| 3,332,856 | 7/1967 | Hart | 202/206 |
| 3,340,158 | 9/1967 | Bates | 203/2 |
| 3,309,288 | 3/1967 | Butterbaugh | 203/2 |
| 3,558,729 | 1/1971 | De Graff | 203/99 |
| 3,477,915 | 11/1969 | Gantt et al. | 202/155 |
| 3,115,445 | 12/1963 | Kleiss et al. | 202/160 |

*Primary Examiner*—Wilbur L. Bascomb, Jr.

[57] ABSTRACT

Apparatus and method for controlling the operation of a fractionator by controlling the heat input into said fractionator in a manner such that additional heat requirements of the fractionator are more rapidly satisfied by continuously passing a first steam stream to the fractionator and passing a relatively higher pressure steam stream into a second reboiler of the fractionator during periods of increased heat requirements.

4 Claims, 1 Drawing Figure

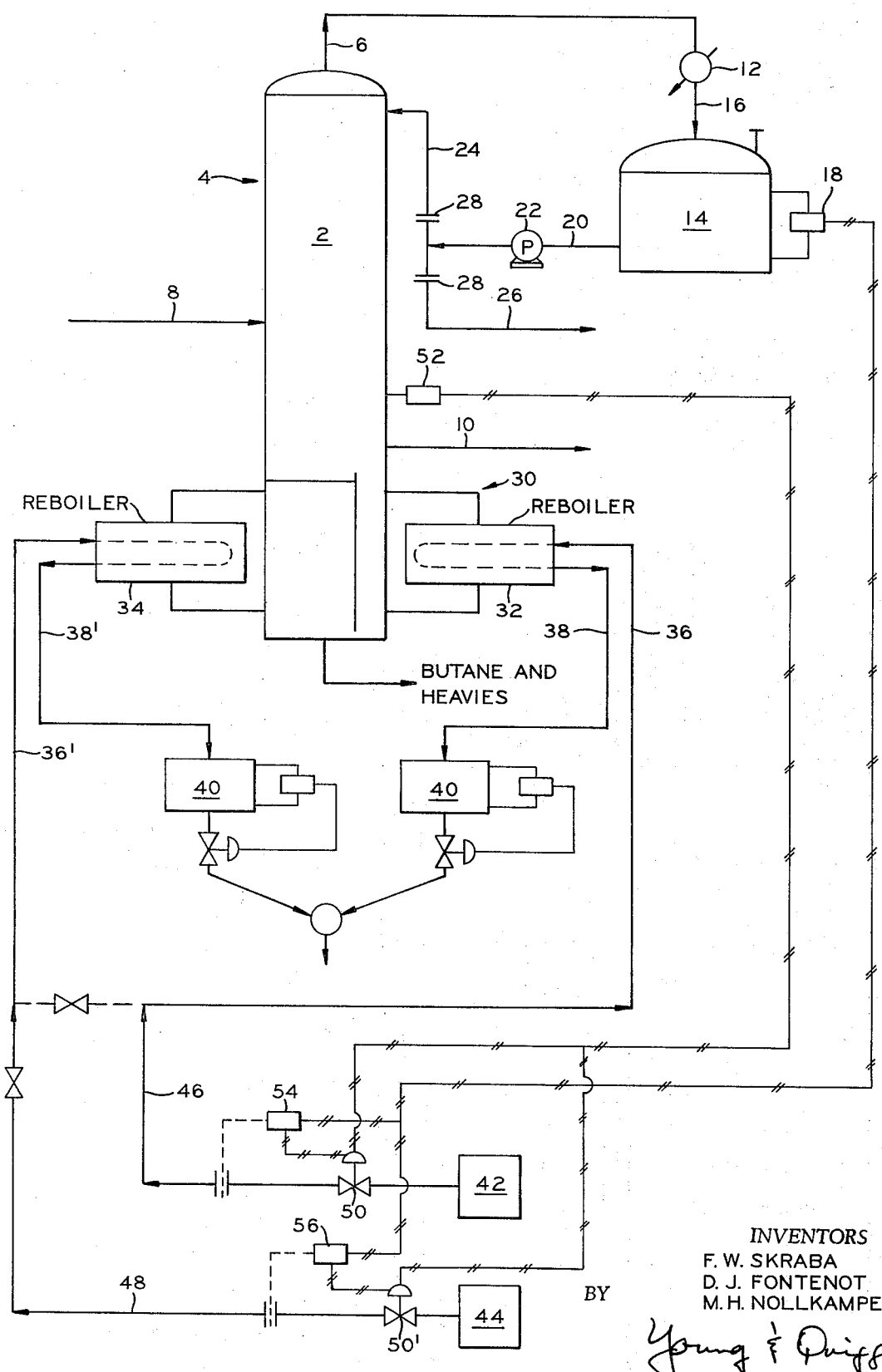

METHOD AND APPARATUS FOR CONTROLLING THE OPERATING OF A FRACTIONATOR

In the fractionation of hydrocarbon feed streams, as known in the art, there often occurs changes in operating conditions such as feed stream compositions, ambient conditions, etc., that require additional heat to the fractionator for causing the desired separation of the feed stream. Heretofore utilized methods for increasing the temperature within the fractionator generally were to increase the flow rate of the steam stream to the reboiler of the fractionator. Although these methods function to satisfy the increased requirements for heat, those additional heat requirements continue for a period of time of longer duration than desirable, which results in producing sometimes large volumes of product that are not of the desired separation.

This invention, therefore, resides in apparatus and method for supplying heat to a fractionator in a manner such that the heat requirements of that fractionator are more swiftly satisfied. In the invention, the fractionation zone of the fractionator has two reboilers with a first steam stream substantially continually flowing through one of the reboilers and a second steam stream having a pressure at least three times greater than the pressure of the first steam stream and being passed through the other reboiler in response to a signal indicating that said fractionator requires additional heat.

By the method of this invention, the heat requirements of the fractionator are more rapidly satisfied, resulting in less fluctuation of the quality of the product discharged therefrom. The more readily available, more economically produced low pressure steam is utilized as the primary heating medium, and a system is provided which has greater flexibility.

Other aspects, objects and advantages of the present invention will become apparent from a study of the disclosure, the appended claims, and the accompanying drawing.

The drawing is a diagrammatic view of a fractionator with the apparatus of this invention. In the drawing, the fractionator 2 has an upper end portion 4 with an overhead product conduit 6 for discharging an overhead fluid therefrom. A feed stream 8 enters the fractionator at a location lower in elevation than the overhead product conduit 6 and a product conduit 10 is provided near the lower end of the fractionator 2 for passing a fluid therefrom. The fractionator can be any of the various types known in the art.

Vapors discharging from the fractionator 2 pass through conduit 6 and into a condenser 12. The condenser 12 is attached to an accumulator 14 via line 16 for delivering the vapor condensate to the accumulator 14 and recovering said condensate therein.

The liquid level controller 18, for example, is associated with the accumulator 14 for monitoring the height of the vapor condensate therein and delivering a signal representative thereof. That liquid level signal can be a pneumatic or electrical signal, for example.

The accumulator 14 has a line 20 with a pump 22 installed therein for passing liquid from the accumulator 14. First and second lines 24, 26 are attached to the discharge end of the pump 22 for passing a reflux stream from the accumulator 14 into the upper end portion 4 of the fractionator and for passing another stream from the accumulator 14, such as, for example, to a product recovery vessel (not shown). The lines 24, 26 each have means such as orifice plates 28 installed therein for measuring the flow rate therethrough. Other controls, as known in the art, can be provided for passing fluid from the accumulator into lines 24, 26 at a substantially constant, continuous flow rate.

A reboiling zone 30 is associated with the fractionator 2 for heating the hydrocarbon feed stream in the fractionator 2. The reboiling zone 30 comprises first and second separate reboilers 32, 34. Each reboiler 32, 34 has an inlet and an outlet line 36, 36', 38, 38' for the passage of steam thereinto and therefrom. The outlet lines can be connected to condensate kegs 40 as known in the art.

First and second steam sources 42, 44 are each connected via associated lines 46, 48 to their respective reboiler inlet lines 36 or 36'. Controlling valves 50, 50' are associated with respective lines 46, 48 for controlling the flow of steam therethrough. The valve 50' associated with the second steam source 44 is normally in the closed state and valve 50 is preferably in the opened state. The first steam source 42 has a pressure in the range of about 30 to about 75 psi and the second steam source 44 has a pressure at least greater that about three times the pressure of said first steam source 42. A pressure-sensor-signalling apparatus 52, as known in the art, is preferably associated with the fractionator 2 and connected to the first and second controlling valves 50, 50'. The apparatus 52 has a set point and is operable to deliver an overriding signal to the valves 50, 50' and cause said valves to close in response to the pressure within the fractionator 2 being a value greater than the preselected set point.

The second valve 50' is also connected to the liquid level controller 18 for receiving the signal therefrom for regulating the opening of said valve in response thereto.

Flow rate controllers 54, 56 can be associated with respective lines 46 and 48 and respective controlling valves 50, 50' for controlling the rate of flow through said valves 50, 50' during periods when said valves 50, 50' are in an open position. These flow rate controllers 54, 56 can be of various construction as known in the art for changing flow rates in response to receiving a signal from element 18 with said changes being regulated relative to time intervals, temperature changes or other various combinations. These controllers are overridden by a signal from element 52.

In the method of this invention, the feed stream 8 passes into the fractionator 2, is heated and separated therein, and the separated constituents are thereafter passed therefrom. The vapors discharging from the upper end portion 4 of the fractionator 2 are at least partially condensed and the vapor condensate is recovered in accumulator 14. Fluid is then discharged from the accumulator 14 at a substantially constant flow rate, said fluid being divided into a reflux stream that is cycled to the fractionator 2 and a product stream that is passed from the system. The liquid level in the accumulator is substantially constantly measured.

The feed stream 8 charging the fractionator 2 is heated therein by steam flowing through the reboilers 32, 34 of the reboiling zone.

During normal operation, steam passes only from the first steam source through the first reboiler. When the fractionator's operating conditions change, the liquid level in the accumulator can fall owing to the decrease in product charged thereto whose flow rate becomes less than the flow rate of fluid removed therefrom.

Generally, the liquid level within the accumulator will be maintained relatively constant. The falling of the liquid level in the accumulator causes a signal to be delivered to valve 50' which causes the valve to open and pass steam from the second steam source 44 to the second reboiler 34. Owing to the greater heat content of the second steam stream, the fractionator temperature is rapidly raised to a desirable value which causes more product to be delivered to the accumulator. As the liquid level in the accumulator raises, the liquid level controller causes the valve 50' to begin closing and flow of the higher pressures steam to the second reboiler is reduced and/or terminated. In the event of malfunction in a manner in which the pressure of the fractionator exceeds a preselected value, a signal is delivered to valves 50, 50' which causes the valves to close, thereby terminating the flow of steam to the fractionator.

By so controlling the heat input into the reboiling zone by the method and apparatus of this invention, relatively low pressure steam is utilized for supplying substantially all of the heat requirements of the fractionator during normal operation of the fractionator. Upon the upset of operating conditions, the provided high pressure steam is automatically, controllably charged to a second reboiler which causes the fractionator operating conditions to be rapidly returned to a desirable level, thereby reducing the volume of undesirable product produced.

Other modifications and alterations of this invention will become apparent to those skilled in the art from the foregoing discussion, examples and accompanying drawing, and it should be understood that this invention is not to be unduly limited thereto.

What is claimed is:

1. A method for controlling the operation of a fractionator, comprising:
    passing a first steam stream through a first reboiler of the fractionator;
    condensing at least a portion of the vapors discharging from the upper end portion of the fractionator;

recovering the vapor condensate in an accumulator;

passing a portion of the vapor condensate from the accumulator into the upper end portion of the fractionator as a reflux stream, said reflux stream passing at substantially constant flow rates;
    passing another portion of the vapor condensate from the accumulator at substantially a constant flow rate;
    monitoring the liquid level of the vapor condensate in the accumulator and delivering a signal representative thereof;
    controllably passing said first steam stream through said first reboiler in response to said signal; and
    controllably passing a second steam stream through a separate second reboiler of the fractionator only in response to the signal being representative of a liquid level lower than a preselected value for controlling the temperature of the fractionator by the second steam stream in response to the height of the vapor condensate in the accumulator, said second steam stream having a pressure at least greater than the pressure of said first steam stream.

2. A method, as set forth in claim 1, including measuring the pressure within the fractionator;
    delivering a second signal in response to the measurement of a pressure above a preselected value; and terminating the flow of the first and second steam streams to the fractionator in response to the second signal.

3. In a fractionator having a reboiler zone associated therewith for controlling the temperature thereof, the improvement comprising:
    first and second separate reboilers associated with the fractionator;
    a first steam source;
    a separate second steam source having a pressure at least greater than about three times the pressure of said first steam source;
    a condenser connected to an upper end portion of the fractionator for condensing vapors therefrom;

an accumulator connected to the condenser for receiving the vapor condensate therefrom;
    first means for passing a reflux stream of vapor condensate from the accumulator into the upper end portion of the fractionator at substantially constant rate of flow;
    second means for passing another fluid stream from the accumulator at a substantially constant rate of flow;
    a liquid level means for substantially, continuously monitoring the liquid level within the accumulator and delivering a signal representative thereof;
    third means for controllably passing a first steam stream from a first steam source through the first reboiler;
    a conduit connected to the second steam source and a second reboiler for passing a second steam stream from the second steam source through the second reboiler;
    fourth means associated with the conduit and the liquid level means for receiving the signal from the liquid level means and controllably passing the second steam stream to the second reboiler only in response to said received signal being representative of a liquid level lower than a preselected value; and fifth means associated with the third means and the liquid level means for controllably passing the first steam stream from the first steam source through the first reboiler in response to the height of the liquid level in the accumulator.

4. A fractionator, as set forth in claim 3, including means associated with the fractionator for measuring the pressure within the fractionator and delivering a second signal in response to measuring a pressure greater than a preselected value; and
    means associated with the conduit and the first steam stream for interrupting the flow of the first and second steam streams to their associated reboilers in response to receiving the second signal.

* * * * *